Patented Dec. 21, 1926.

1,611,349

UNITED STATES PATENT OFFICE.

ERNEST HOPKINSON, OF NEW YORK, N. Y., ASSIGNOR TO THE NAUGATUCK CHEMICAL COMPANY, OF NEW HAVEN, CONNECTICUT, A CORPORATION OF CONNECTICUT.

PROCESS FOR MIXING SUBSTANCES WITH RUBBER LATEX.

No Drawing.    Application filed February 9, 1922.    Serial No. 535,372.

This invention relates to processes for mixing substances with rubber latex either in its normal condition or diluted or concentrated as desired; and to the products obtained therefrom. The term "rubber latex" as herein used means the juices of plants producing rubber, balata, or gutta percha.

The processes heretofore employed for mixing various substances with rubber have employed crude rubber, that is, the ordinary form of rubber prepared by coagulation of rubber latex milled, washed and dried. The mixing process heretofore employed involving a further milling, is one in which the crude rubber is introduced between heated rolls and its condition altered by the mechanical action of the rolls and by the heat, which "break down" the rubber so that the desired substances may be incorporated therein. The ordinary processes of preparing crude rubber deprive the rubber of certain of its constituents and alter the characteristics of the products obtained, for example, the processes of coagulation and washing as ordinarily conducted cause a loss of water-soluble proteins, gums etc. from the mass and the milling processes tend to lessen the strength of the rubber.

This application is a continuation in part of my co-pending applications Sr. Nos. 351,945, filed January 16, 1920, 351,946, filed January 16, 1920, 376,373, filed Apr. 24, 1920, 326,276, filed Sept. 25, 1919.

The present invention aims to do away with disadvantages of the methods of compounding formerly carried out and seeks to provide a homogeneous mixture of substances with rubber without the loss of valuable constituents and properties of the rubber and with considerable saving in the amount of labor and machine operation in securing this end. Another object of the invention is to provide a series of products having improved physical properties when compared with similar products obtained by the methods heretofore employed.

The invention accordingly comprises a process for treating rubber latex or similar material which includes combining a compounding ingredient with the latex, and mixing the latex and compounding ingredient during coagulation until the coagulated latex is substantially able to retain the ingredient approximately uniformly dispersed therein. It also includes combining latex with a compounding ingredient in the presence of glue, and recovering the combination of rubber and compounding ingredient. The combination of compounding ingredient and rubber obtained by the procedures mentioned is preferably vulcanized thereafter either through the action of a vulcanizing agent added as a compounding ingredient or by a vulcanizing agent applied exteriorly, or by a vulcanizing agent, part of which is combined in the compounding and part of which is applied exteriorly; or in any desired manner.

The invention in its preferred form comprises adding one or more compounding ingredients to latex, and evaporating so that a mass of rubber containing all of the solid constituents of the rubber and the compounding ingredient is obtained, although the invention may also be carried out satisfactorily without recovery of all of the solid constituents of the latex. If the compounding ingredient added is adapted to absorb water from the latex and thereby to cause local coagulation in the latex, the ingredient is preferably wetted to avoid such coagulation, or the latex is treated with an agent adapted to prevent coagulation upon introduction of a compounding ingredient, for example, the latex may be treated to form a suspension with 2% by weight based on the weight of the latex taken of dry glue previously dissolved in water. These materials are added to the latex and upon subsequent addition of another compounding ingredient or ingredients act to prevent or retard coagulation. Upon subsequent drying of the latex combined with compounding ingredients, where any of the treatments mentioned has been carried out, a homogeneous mixture of the mass is secured and this homogeneous mixture will remain without substantial change, particularly where the apparent specific gravity of the compounding ingredient and that of the latex are substantially the same. However, where there is a wide difference between the specific gravities of the substances being mixed with the latex and that of the latex itself, or where exceptional uniformity of the mixture irrespective of differences in specific gravity is desired, the homogeneity of the mixture is preferably maintained after addition of the compounding ingredient and during coagulation. In this connection it will be understood that the coagulation process comprises two stages (1) in which a soft thickened mass appears, and (2) where this thickened mass changes into solid rubber. The thickened mass has a greater power than the latex itself to retain substances uniformly dispersed therein, but not so great a power as crude rubber. Gradually as coagulation progresses this power increases until the solid or crude rubber is formed. In order to maintain the homogeneity of the mixture during coagulation, the mixture of latex and compounding ingredient is placed in a mill or other agitating device and constantly stirred until a substantially uniform dispersion of the ingredient in solid rubber is secured.

As a specific example of the invention, the following ingredients are mixed: rubber latex equivalent to 100 parts dry rubber, 10 parts of zinc oxide, 8 parts of sulphur, and 2 parts of glue. The latex is emulsified with the glue and the zinc oxide and sulphur added previously wetted or not as desired. Clay or other materials hereinafter specified may be added in suitable quantities. After the addition of the compounding ingredients to the latex and while coagulation is in progress the mass may be put into a mixing machine for example of the type known as the Werner-Pfleiderer mixing machine and thoroughly mixed in order to preserve the homogeneity of the mixture. The mass is evaporated preserving all of the solid constituents of the latex and vulcanized at 60 lbs. steam pressure for approximately 1 hr. when vulcanization is complete. The drying in the mixer is preferably carried on until the mass is in a granular condition and may be readily handled. At this time it still may contain considerable moisture, although there is substantially no moisture that can be drained from the mass. The remaining moisture is then preferably dried outside of the mixer.

In the procedure given preferably all of the solid constituents of the latex are obtained along with compounding ingredients added. The vulcanization of this mass is faster than would be obtained by compounding ordinary crude rubber with the compounding ingredients mentioned. This is due largely to the presence of various proteins and other bodies found as natural constituents in the latex. It has been found that the tensile strength, resistance to abrasion and other physical properties of the compounded rubber thus obtained are improved when compared with similar compounds of crude rubber with similar quantities and kinds of compounding ingredients employed.

The uniform mixture obtained by the procedure outlined avoids the large expenditure of power for milling of tough rubber to accomplish mixing of the ingredients which is, as has been pointed out, ordinarily resorted to for introduction of compounding ingredients in crude rubber. Due to the toughness of crude rubber the milling operation heretofore practiced usually requires a relatively greater expenditure of power as compared with the mixing operation in the present process which being conducted upon uncoagulated rubber requires only a limited application of power.

It will be observed that although rubber latex containing approximately 30% of dry rubber is employed in the examples given, latex in a more dilute form or a more concentrated form such for example as the so-called "latex butter" prepared by evaporation, or other means of removal of moisture from the latex, may be employed. This so-called "latex butter" sometimes contains as high as 85% of rubber. The compounding ingredients herein referred to may be generally classified as follows, although it will be understood that various other compounding ingredients than those mentioned herein fall within the bounds of the invention.

*Mineral fillers including pigments.*

Zinc oxide, carbon black, lamp black, whiting, iron oxide, chrome green, ultra-marine blue, lithophone, clays, etc.

*Accelerating and vulcanizing ingredients.*

Organic and inorganic vulcanizing materials including sulphur, organic and inorganic sulphur-containing compounds, including thiol salts, organic disulphide and monosulphides, condensation products of aldehydes and amines, oxygen containing organic compounds and amines, etc.

*Softening agents including oils, fats, waxes and tars.*

Coal tar naphtha, paraffine, non-volatile petroleum distillates, petrolatum, etc.

*Organic fillers other than softening agents.*

Glue, casein, rubber cement, scrap vulcanized rubber, reclaimed vulcanized rubber, wood flour, ground rags, paper, wood pulp, etc.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for treating rubber latex or similar material which comprises combining a compounding ingredient with the latex, mixing the latex and compounding ingredient during coagulation until the coagulated latex is substantially able to retain the ingredient approximately uniformly dispersed therein, evaporating moisture from the latex while continuing the mixing, and vulcanizing the compounded rubber so obtained.

2. A process for treating rubber latex or similar material which comprises combining a vulcanizing ingredient with the latex, mixing the latex and vulcanizing ingredient during coagulation until the coagulated latex is substantially able to retain the ingredient approximately uniformly dispersed therein, evaporating moisture from the latex while continuing the mixing, and vulcanizing the compounded rubber so obtained.

3. A process for treating rubber latex or similar material which comprises agitating the latex with an ingredient during coagulation until the coagulated latex is approximately able to support the ingredient uniformly dispersed therein, and evaporating moisture from the latex while continuing the mixing.

Signed at New York, New York, this 4th day of February, 1922.

ERNEST HOPKINSON.